US012389884B2

(12) United States Patent
Granger et al.

(10) Patent No.: US 12,389,884 B2
(45) Date of Patent: Aug. 19, 2025

(54) AVIAN NEST GUARD

(71) Applicants: Lars Granger, Elkton, MD (US);
Dusten Moir, Elkton, MD (US)

(72) Inventors: Lars Granger, Elkton, MD (US);
Dusten Moir, Elkton, MD (US)

(73) Assignee: AUI POWER, Elkton, MD (US)

( * ) Notice: Subject to any disclaimer, the term of this patent is extended or adjusted under 35 U.S.C. 154(b) by 0 days.

(21) Appl. No.: 18/485,798

(22) Filed: Oct. 12, 2023

(65) Prior Publication Data
US 2025/0120370 A1    Apr. 17, 2025

(51) Int. Cl.
E04B 1/346    (2006.01)
A01K 31/14   (2006.01)

(52) U.S. Cl.
CPC .................... A01K 31/14 (2013.01)

(58) Field of Classification Search
CPC ....................................... A01K 31/14
See application file for complete search history.

(56) References Cited

U.S. PATENT DOCUMENTS

| | | | | |
|---|---|---|---|---|
| 4,167,917 A * | 9/1979 | Noll | ........................ | A01K 31/14 119/57.8 |
| 5,943,981 A * | 8/1999 | Chrisco | .................. | A01K 31/14 119/431 |
| 6,009,837 A * | 1/2000 | McClasky | .............. | A01K 31/14 119/428 |
| 6,477,983 B1 * | 11/2002 | Bette | ....................... | A01K 31/14 119/428 |
| 7,069,877 B2 * | 7/2006 | Ehrreich | .................. | A01K 1/03 119/485 |
| 7,320,295 B2 * | 1/2008 | Ehrreich | .................. | A01K 1/03 119/485 |
| 8,205,577 B2 * | 6/2012 | Sia | ......................... | A01K 31/18 119/449 |
| 10,973,221 B1 * | 4/2021 | Caffrey | ................. | A01M 23/08 |
| 2002/0174836 A1 * | 11/2002 | Rasmussen | ............ | A01K 31/14 119/431 |
| 2005/0072370 A1 * | 4/2005 | Braden | ................... | A01K 31/14 119/431 |
| 2005/0178341 A1 * | 8/2005 | Ehrreich | .................. | A01K 1/03 119/482 |
| 2006/0065206 A1 * | 3/2006 | Carter | .................... | A01K 31/14 119/429 |

(Continued)

*Primary Examiner* — Basil S Katcheves
(74) *Attorney, Agent, or Firm* — GIBRALTAR CONSULTING LLC; Tariq S. Najee-Ullah

(57) ABSTRACT

Disclosed herein is a nesting platform for a transmission tower. The nesting platform includes one or more floor panels with a substantially planar surface, connected to first and second side walls. The platform further comprises a first strut channel with one or more slots, and an L-clamp with a threaded rod that can be retained in a slot of the first strut channel using a nut. Additionally, a second strut channel with one or more slots is provided, along with one or more angle connectors connecting the first and second strut channels. A support guide is connected to the second strut channel, with a protruding structure that connects to the floor panels. The platform also includes an end cap connected to the floor panels. This nesting platform provides a secure and efficient solution for supporting avian nests in transmission towers.

20 Claims, 16 Drawing Sheets

(56) References Cited

U.S. PATENT DOCUMENTS

2006/0272592 A1* 12/2006 Ehrreich ............... A01K 31/14
　　　　　　　　　　　　　　　　　　　　119/485
2007/0138355 A1*  6/2007 Maurer ............... A01K 39/012
　　　　　　　　　　　　　　　　　　　　248/121

* cited by examiner

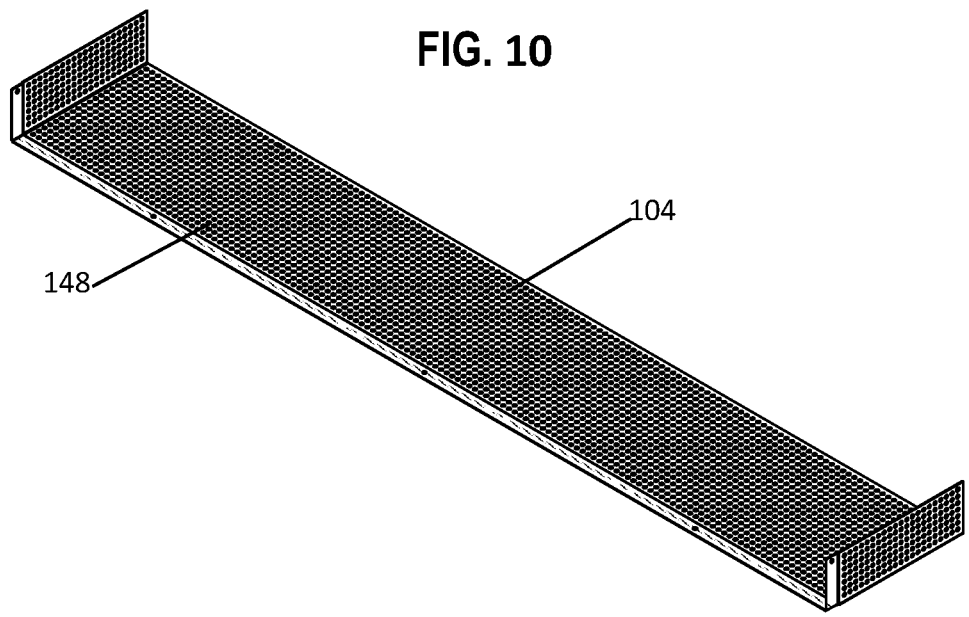
FIG. 10
FIG. 10A
FIG. 10B
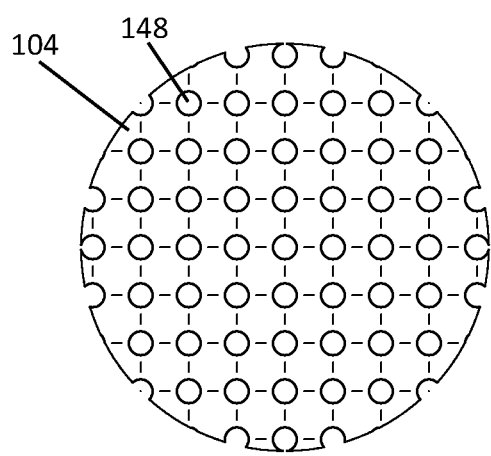
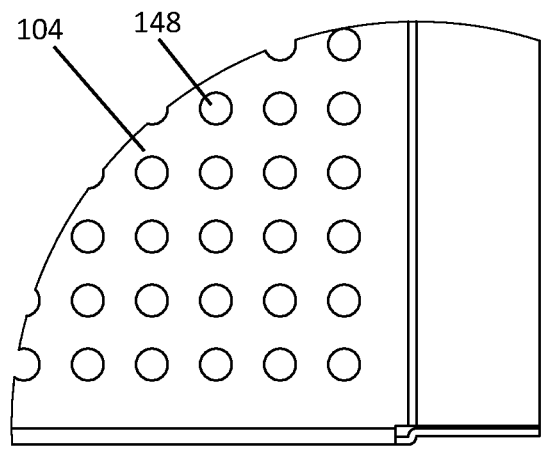

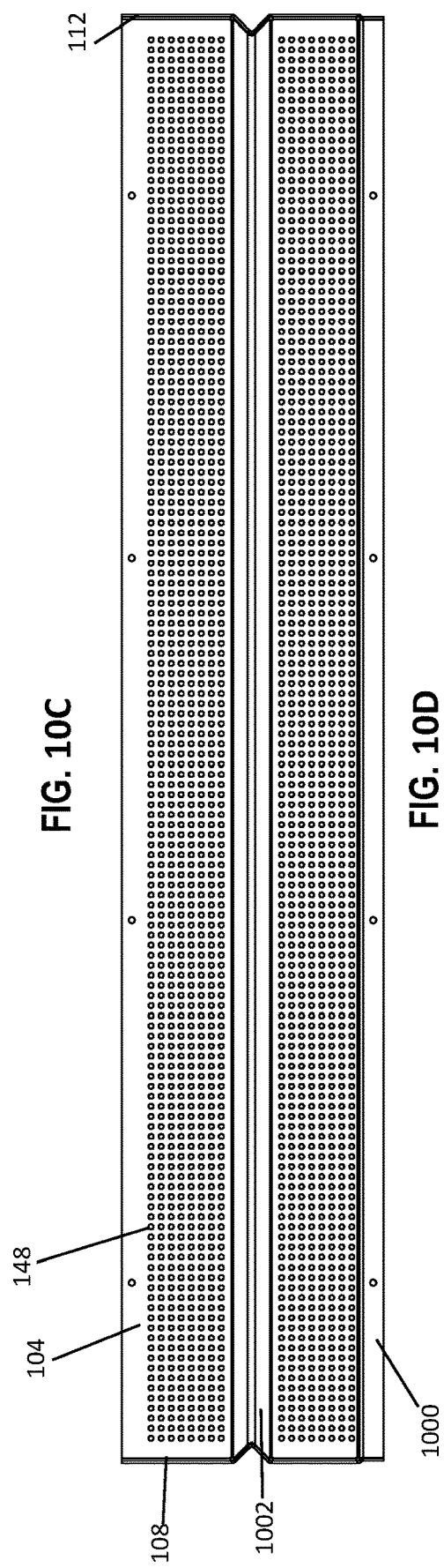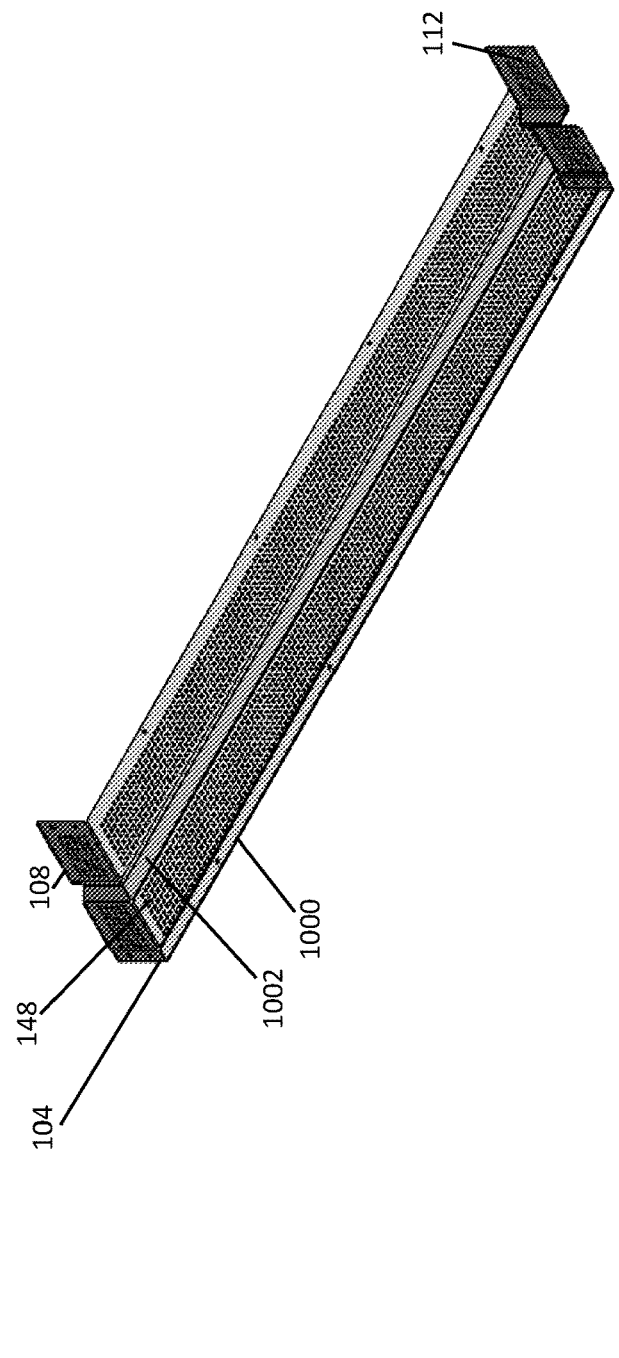

DETAIL C
SCALE 1 : 4

AVIAN NEST GUARD

FIELD OF INVENTION

Embodiments disclosed herein relate to an avian nest guard, more particularly to a modular nesting platform for bird nests located on a transmission tower.

BACKGROUND OF THE INVENTION

Many injured and/or breeding birds require safe places to nest during, for example, their recovery and/or during breeding season. Some avian nesting locations are built on unsafe overhead structures such as on power poles, transmission towers, and other infrastructure. A broad range of bird diverter devices exist in today's market to prevent a bird from building a nest at a predetermined location. Despite many preventative devices currently being used, birds still manage to find a way to build nests in some of these locations and render many of these bird diverter devices ineffective. It would be more desirable to facilitate bird nesting in transmission towers as to promote a safer nesting solution for birds seeking shelter while ensuring potential power disruptions for energy consumers are minimized. Thus, there is a need for a secure and stable structure configured to be removably connected to a transmission tower, for a bird to build a nest within proximity, that reduces and/or eliminates potential power outages from nest debris encountering the power lines.

Eagle nests, for example, may vary in size from approximately four feet to approximately six feet across and approximately two feet to approximately four feet tall and weigh up to a ton. Some avian nests may create a safety issue for the birds as well for people in the surrounding area. Untidy nests, dangling branches, and even eagle excrement are undesirable and loose debris may become dangerous projectiles during windy and/or stormy environmental conditions.

As a result, some bird nests may damage lines, towers, and objects located below and/or within the proximity of the nest. Many high voltage transmission towers support one or more overhead lines serving the energy distribution. Most frequently three-phase AC circuits are used requiring three live conductors each. To provide safety against lightning, earthed conductors are placed at the top of the tower. The live conductors are supported by insulators, the length of which increases with increasing voltage of the circuit. Some types of towers include, but are not limited to, suspension towers, angle suspension towers, angle towers, tension towers, and terminal towers. Some high voltage transmission lines have been known to experience a negative impact from avian nests that may result in a power outage and/or an interruption in power delivery to customers. For example, if a stick from an avian nest that is in a transmission tower slips onto a conductor below, burns, and then falls free, it may cause a power outage. In response to identification of a potential power outage threat, removal of a nest and/or trimming the most hazardous-looking sticks from the bottom of the nest structure within a transmission tower constitutes a challenge. Further, an adult eagle incubating its egg is warranted protection. It is more desirable to protect both breeding eagles and energy customers by not removing the nest during the critical phase of incubation. Thus, there is a need to stabilize and secure existing bird nests and to facilitate safe building of new bird nests on transmission towers.

Accordingly, there remains a need for improved avian nest guard structures for transmission towers. This need and other needs are satisfied by the various aspects of the present disclosure.

SUMMARY OF THE INVENTION

In accordance with the principles of the present invention, an avian nesting platform may include one or more floor panels, the one or more floor panels having a substantially planar surface, a first side wall is connected to a first end of the one or more floor panels, a second side wall is connected to a second end of the one or more floor panels. An avian nesting platform may include a first strut channel, the first strut channel having a first side located opposite a channel side, the first strut channel having one or more slots. An avian nesting platform may include an L-clamp, the L-clamp having a first wall located perpendicular to a second wall, the first wall of the L-clamp is connected to a first end of a threaded rod, a second end of the threaded rod of the L-clamp is configured to be retained in a slot of the one or more slots of the first strut channel with a nut. An avian nesting platform may include a second strut channel, the second strut channel having a first side located opposite a channel side, the second strut channel having one or more slots. An avian nesting platform may include one or more angle connectors; the one or more angle connectors having a first side located perpendicular to a second side, the first side of the one or more angle connectors connected to at least a portion of the channel side of the first strut channel, the second side of the one or more angle connectors connected to at least a portion of the channel side of the second strut channel. An avian nesting platform may include a support guide, at least a portion of the support guide connected to the first side of the second strut channel, the support guide having a protruding structure, the protruding structure connected to at least a portion of the one or more floor panels; and. An avian nesting platform may include an end cap, the end cap connected to the one or more floor panels, and which also includes improvements that overcome the limitations of prior art avian nest guards is now met by a new, useful, and non-obvious invention.

In some aspects, the techniques described herein relate to a nesting platform, wherein the one or more floor panels having at least one opening.

In some aspects, the techniques described herein relate to a nesting platform, wherein the one or more floor panels having a plurality of openings, the plurality of openings oriented in a square lattice geometry.

In some aspects, the techniques described herein relate to a nesting platform, wherein the one or more floor panels having a flange, the flange of a first floor panel is configured to connect to at least a portion of a second floor panel.

In some aspects, the techniques described herein relate to a nesting platform, wherein the end cap having a substantially planar surface, a first side wall is connected to a first end of the end cap, a second side wall is connected to a second end of the end cap, a third side wall is located perpendicular to the first side wall and the second side wall.

In some aspects, the techniques described herein relate to a nesting platform, wherein the substantially planar surface of the end cap having at least one opening.

In some aspects, the techniques described herein relate to a nesting platform, wherein the substantially planar surface of the end cap having a plurality of openings, the plurality of openings oriented in a square lattice geometry.

In some aspects, the techniques described herein relate to a nesting platform, wherein the first side wall, the second side wall, and the third side wall of the end cap have one or more openings.

In some aspects, the techniques described herein relate to a nesting platform, wherein the first side wall and the second side wall of the end cap having a recessed portion.

In some aspects, the techniques described herein relate to a method of installing a nesting platform onto a transmission tower, including the steps of: providing a transmission tower; providing one or more floor panels, the one or more floor panels having a substantially planar surface, a first side wall is connected to a first end of the one or more floor panels, a second side wall is connected to a second end of the one or more floor panels; providing a first strut channel, the first strut channel having a first side located opposite a channel side, the first strut channel having one or more slots; providing an L-clamp, the L-clamp having a first wall located perpendicular to a second wall, the first wall of the L-clamp is connected to a first end of a threaded rod, a second end of the threaded rod of the L-clamp is configured to be retained in a slot of the one or more slots of the first strut channel; connecting the first strut channel to at least a portion of the transmission tower with the L-clamp, wherein the second side of the L-clamp is connected to at least a portion of the transmission tower and the first side of the L-clamp with the threaded rod is oriented parallel to the first side of the first strut channel; providing a second strut channel, the second strut channel having a first side located opposite a channel side, the second strut channel having one or more slots; providing one or more angle connectors; the one or more angle connectors having a first side located perpendicular to a second side; connecting the first side of the one or more angle connectors to at least a portion of the channel side of the first strut channel; connecting the second side of the one or more angle connectors to at least a portion of the channel side of the second strut channel; providing a support guide, the support guide having a protruding structure; connecting at least a portion of the support guide to the first side of the second strut channel; connecting the protruding structure of the support guide to at least a portion of the one or more floor panels; providing an end cap; and connecting the end cap to the one or more floor panels to form the nesting platform.

In some aspects, the techniques described herein relate to a method, further including securing the first strut channel below a nest retained in the transmission tower.

In some aspects, the techniques described herein relate to a method, further including inserting the second end of the threaded rod of the L-clamp into the slot of the one or more slots of the first strut channel, connecting a nut to the second end of the threaded rod to secure the first strut channel to the transmission tower.

In some aspects, the techniques described herein relate to a method, wherein the one or more floor panels having at least one opening.

In some aspects, the techniques described herein relate to a method, wherein the one or more floor panels having a plurality of openings, the plurality of openings oriented in a square lattice geometry.

In some aspects, the techniques described herein relate to a method, wherein the one or more floor panels having a flange, connecting the flange of a first floor panel to at least a portion of a second floor panel.

In some aspects, the techniques described herein relate to a method, wherein the end cap having a substantially planar surface, a first side wall is connected to a first end of the end cap, a second side wall is connected to a second end of the end cap, a third side wall is located perpendicular to the first side wall and the second side wall.

In some aspects, the techniques described herein relate to a method, wherein the substantially planar surface of the end cap having at least one opening.

In some aspects, the techniques described herein relate to a method, wherein the substantially planar surface of the end cap having a plurality of openings, the plurality of openings oriented in a square lattice geometry.

In some aspects, the techniques described herein relate to a method, wherein the first side wall, the second side wall, and the third side wall of the end cap have one or more openings.

In some aspects, the techniques described herein relate to a method, wherein the first side wall and the second side wall of the end cap having a recessed portion.

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several aspects of the invention and together with the description, serve to explain the principles of the invention.

FIG. 10 shows a perspective view of a floor panel of the avian nesting platform having a plurality of openings oriented in a square lattice geometry and a flange extending therefrom, in accordance with an exemplary embodiment of the present invention;

FIG. 10A shows a sectional view of the floor panel of FIG. 10 having a plurality of openings oriented in a square lattice geometry, in accordance with an exemplary embodiment of the present invention;

FIG. 10B shows a sectional view of the floor panel of FIG. 10 of the avian nesting platform having a flange extending therefrom, in accordance with an exemplary embodiment of the present invention;

FIG. 10C shows a top plan view of an alternate embodiment of the floor panel of the avian nesting platform having a recess, in accordance with an exemplary embodiment of the present invention;

FIG. 10D shows a perspective view of an alternate embodiment of the floor panel of the avian nesting platform having a recess, in accordance with an exemplary embodiment of the present invention;

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION OF THE INVENTION

The present invention can be understood more readily by reference to the following detailed description of the invention and the Examples included therein.

Before the present articles, systems, devices, and/or methods are disclosed and described, it is to be understood that they are not limited to specific manufacturing methods unless otherwise specified, or to particular materials unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited.

Figure 1:
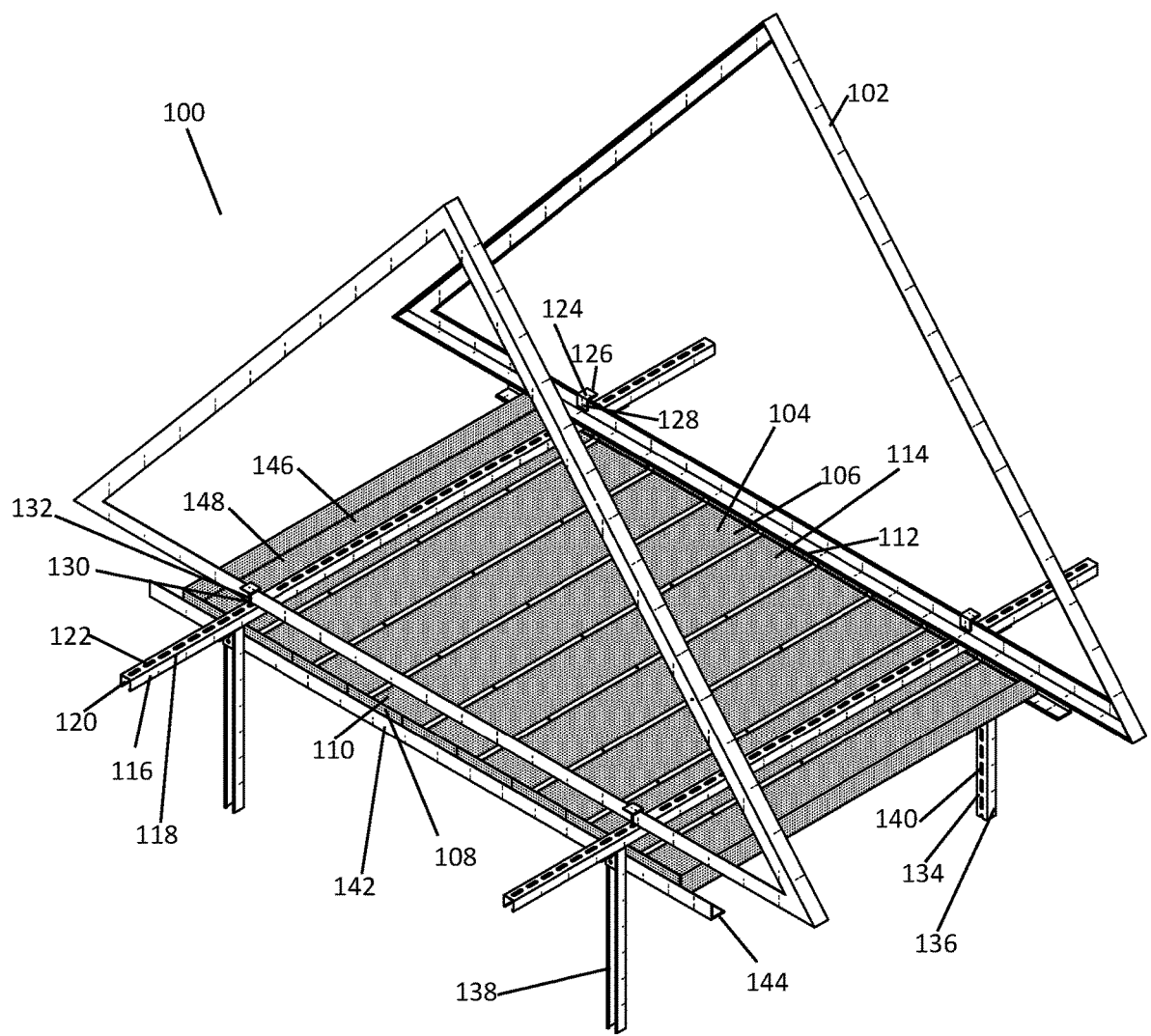
FIG. 1 shows a perspective view of the avian nesting platform connected to at least a portion of a transmission tower, in accordance with an exemplary embodiment of the present invention.
Figure 2:
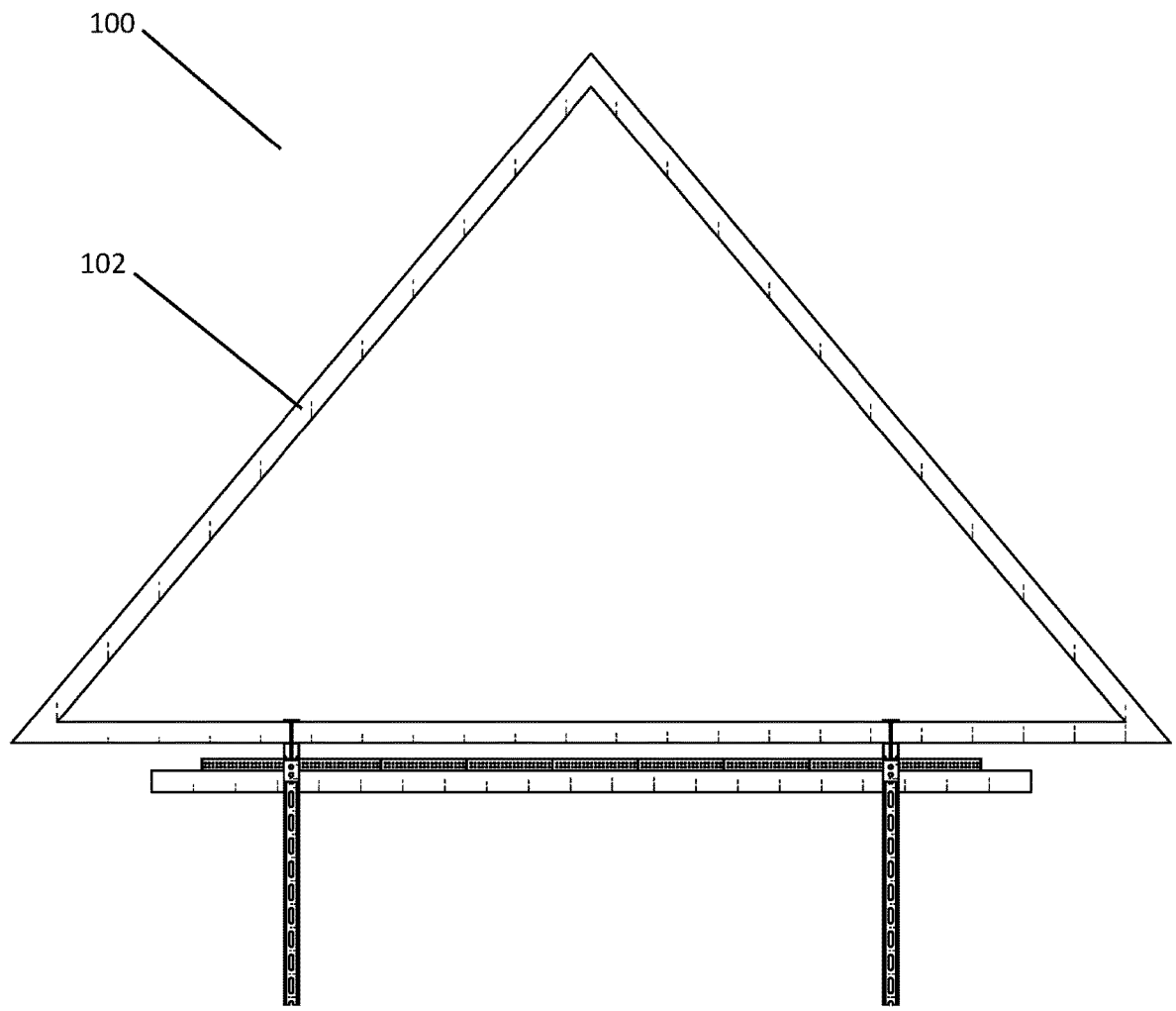
FIG. 2 shows a front plan view of the avian nesting platform connected to at least a portion of a transmission tower, in accordance with an exemplary embodiment of the present invention.
Figure 3:
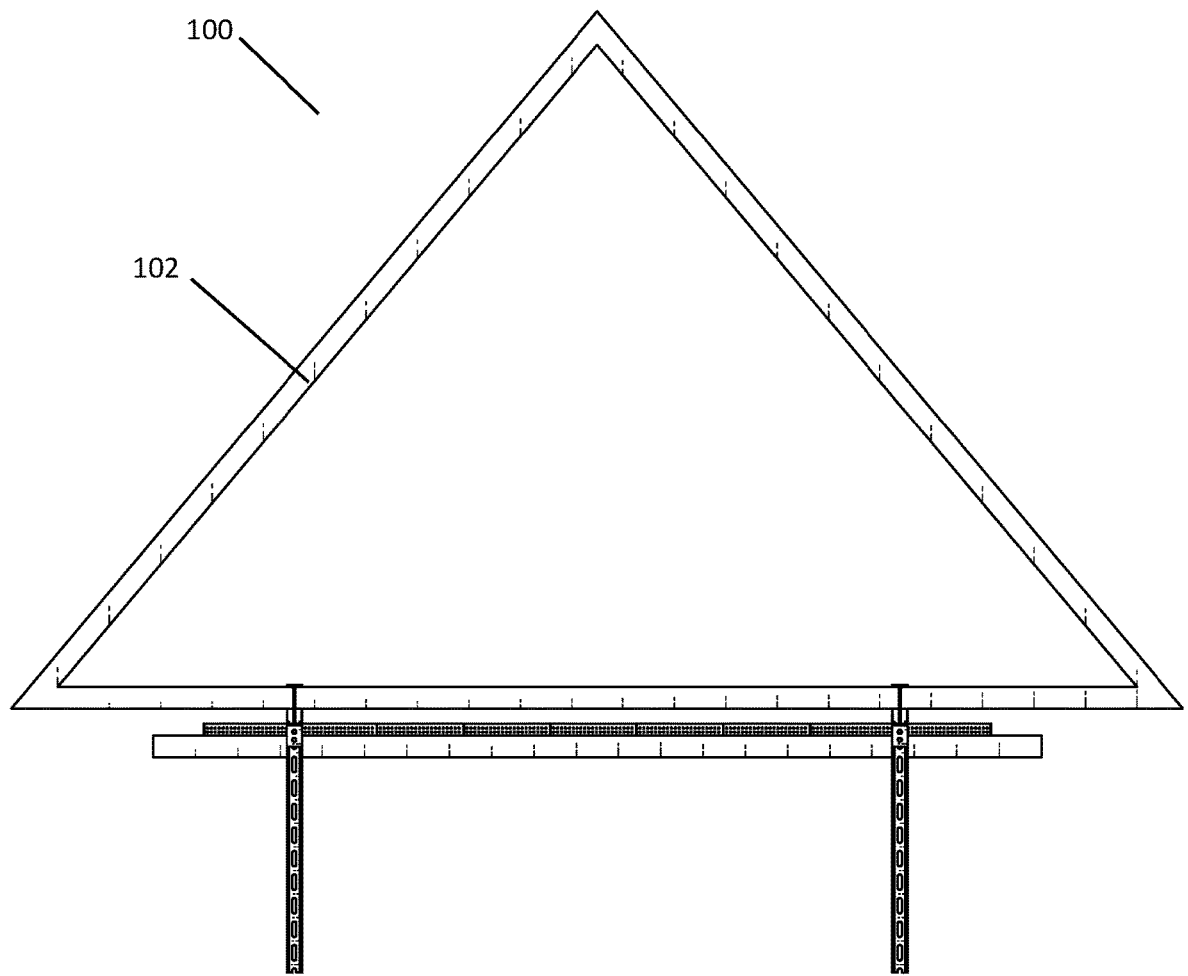
FIG. 3 shows a back plan view of the avian nesting platform connected to at least a portion of a transmission tower, in accordance with an exemplary embodiment of the present invention.
Figure 9:
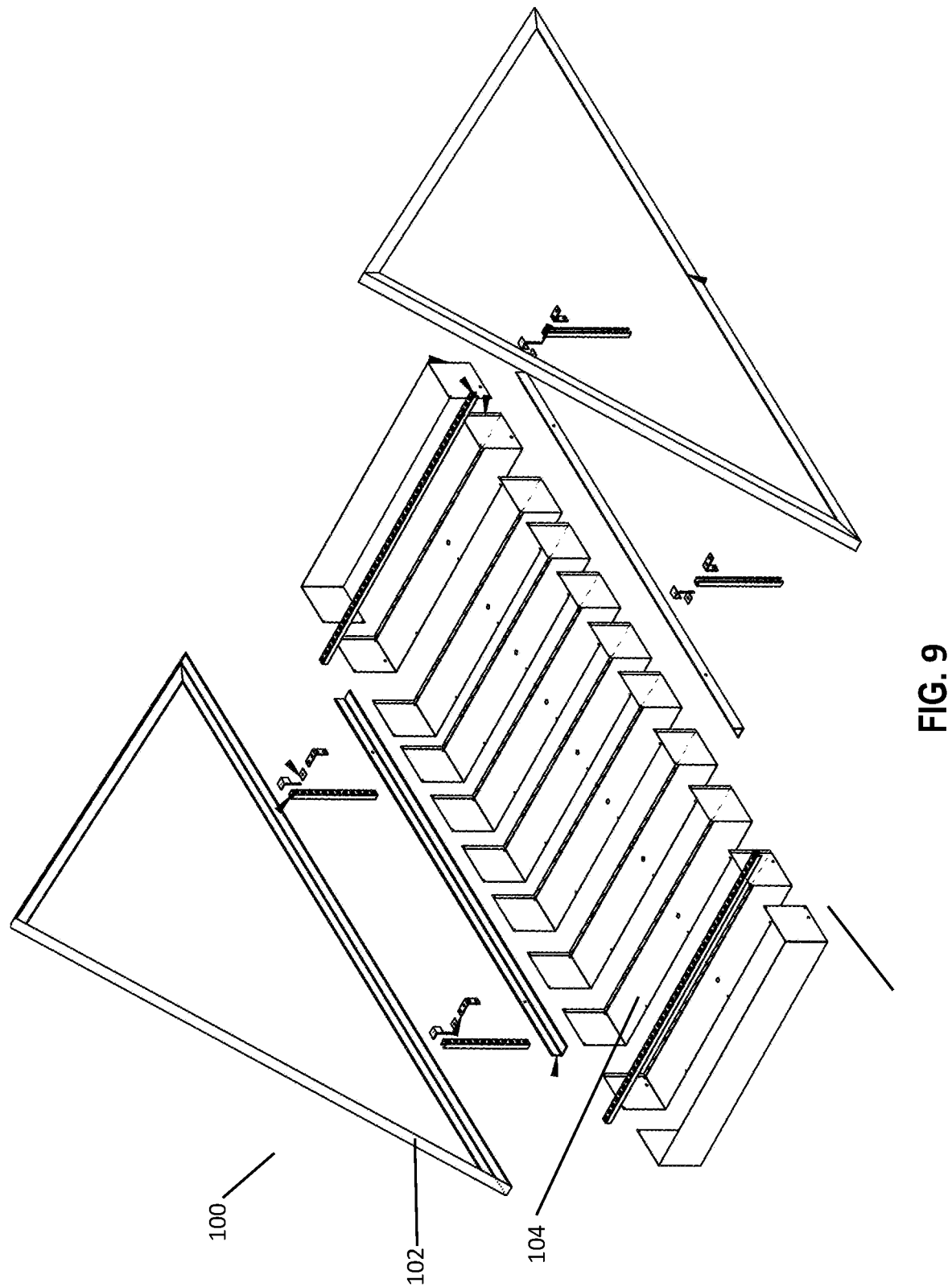
FIG. 9 shows an exploded view of the avian nesting platform configured to be connected to at least a portion of a transmission tower, in accordance with an exemplary embodiment of the present invention.

FIGS. 1-9, 12, and 12A best show avian nesting platform 100 connected to at least a portion of a transmission tower 102. FIGS. 1 and 9 best show nesting platform 100 having one or more floor panels 104. The embodiment of floor panel 104 shown in FIG. 9 is a panel having at least one opening configured to receive a fastener such as a screw, a bolt, and/or a nail. The embodiment of floor panel 104 shown in FIGS. 1, 10, 10A, and 10B is floor panel 104 having a plurality of openings 148 configured to maximize circulation and airflow within the nesting platform.

Referring again to FIG. 1, the one or more floor panels 104 having substantially planar surface 106. First side wall 108 is connected to first end 110 of substantially planar surface 106 of one or more floor panels 104. Second side wall 112 is connected to second end 114 of substantially planar surface 106 of one or more floor panels 104. First strut channel 116 has first side 118 located opposite channel side 120. First strut channel 116 has one or more slot 122. L-clamp 124 has first wall 126 located perpendicular to second wall 128. First wall 126 of L-clamp 124 is connected to first end 132 of threaded rod 130.

Figure 11:
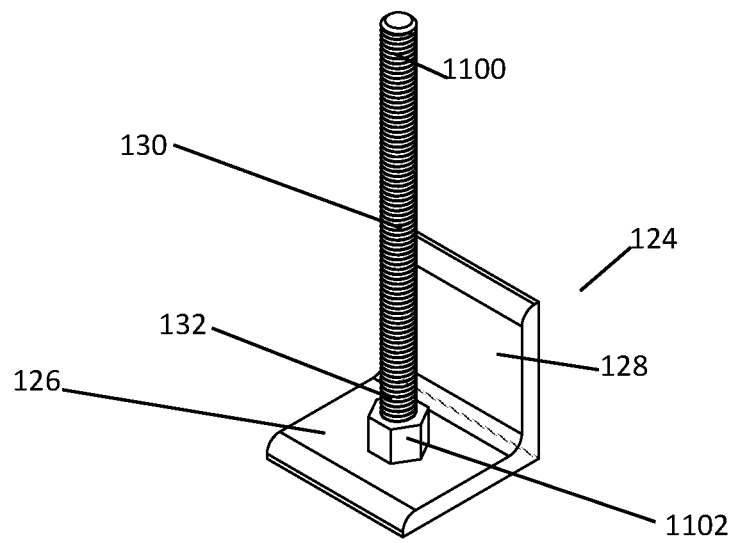
FIG. 11 shows a perspective view of the L-clamp of the avian nesting platform, in accordance with an exemplary embodiment of the present invention.
Figure 11A:
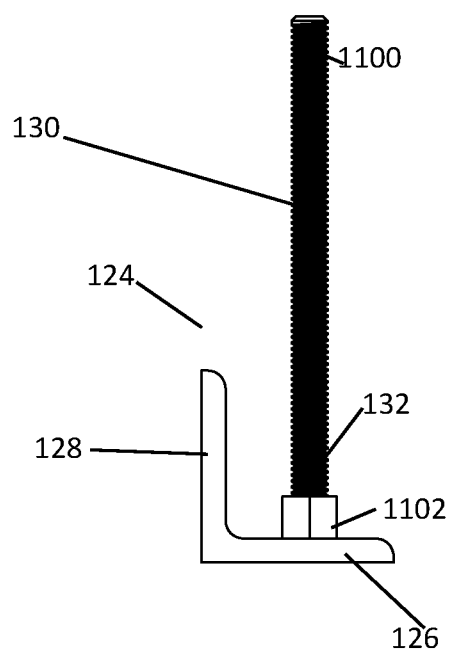
FIG. 11A shows a side plan view of the L-clamp of the avian nesting platform, in accordance with an exemplary embodiment of the present invention.
Figure 11B:
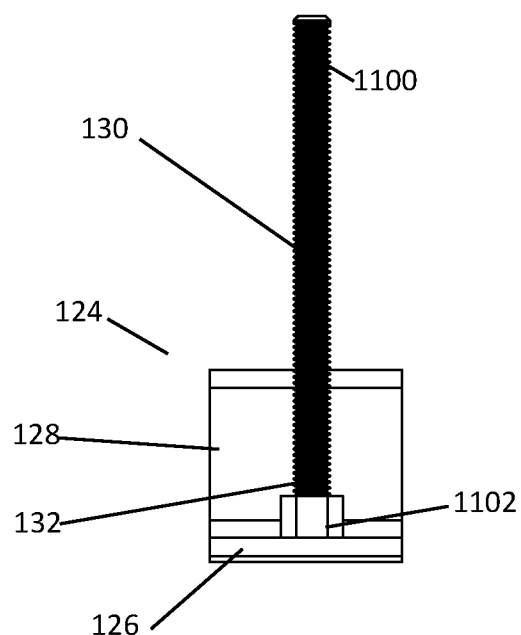
FIG. 11B shows a front plan view of the L-clamp of the avian nesting platform, in accordance with an exemplary embodiment of the present invention.

As best shown in FIGS. 11, 11A, and 11B, L-clamp 124 has first wall 126 located perpendicular to second wall 128. First wall 126 of L-clamp 124 is connected to first end 132 of threaded rod 130.

Figure 12:
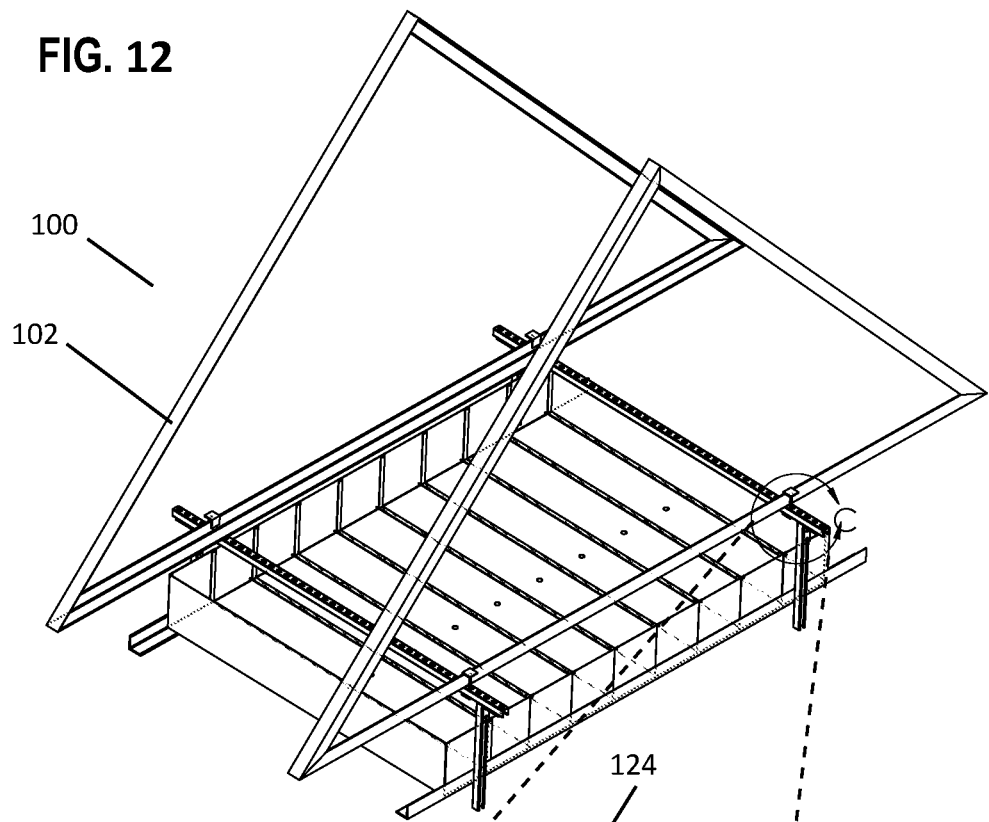
FIG. 12 shows a perspective view of the avian nesting platform connected to at least a portion of a transmission tower, in accordance with an exemplary embodiment of the present invention.
Figure 12A:
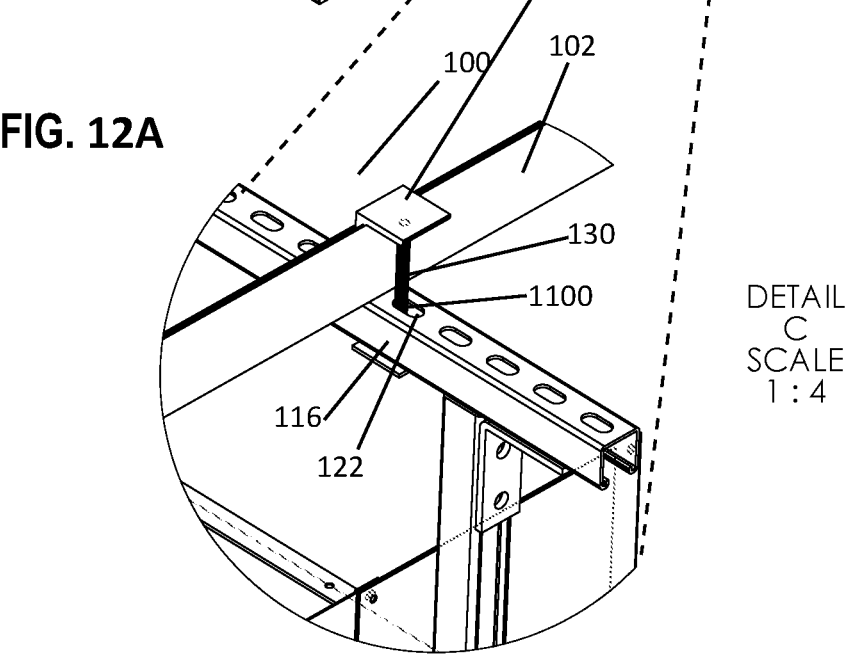
FIG. 12A shows a sectional view of the avian nesting platform connected to at least a portion of a transmission tower, in accordance with an exemplary embodiment of the present invention.

As best shown in FIG. 12A, second end 1100 of threaded rod 130 of L-clamp 124 is configured to be retained in a slot of one or more slots 122 of first strut channel 116 with nut 1102 (FIGS. 11, 11A, and 11B).

Referring again to FIG. 1, second strut channel 136 has first side 134 located opposite channel side 138. Second strut channel 136 has one or more slots 140.

Figure 4:
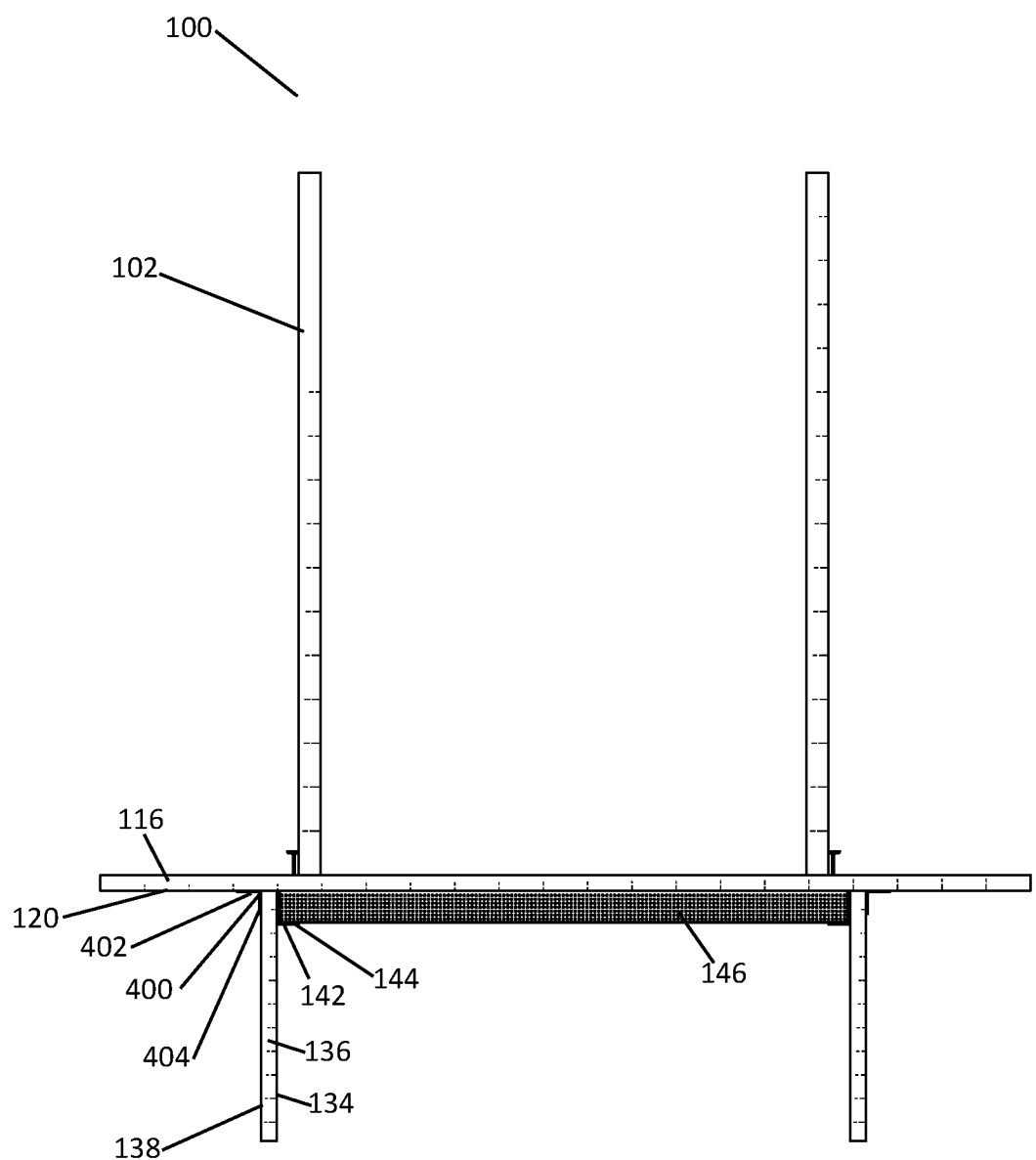
FIG. 4 shows a side plan view of the avian nesting platform connected to at least a portion of a transmission tower, in accordance with an exemplary embodiment of the present invention.
Figure 5:
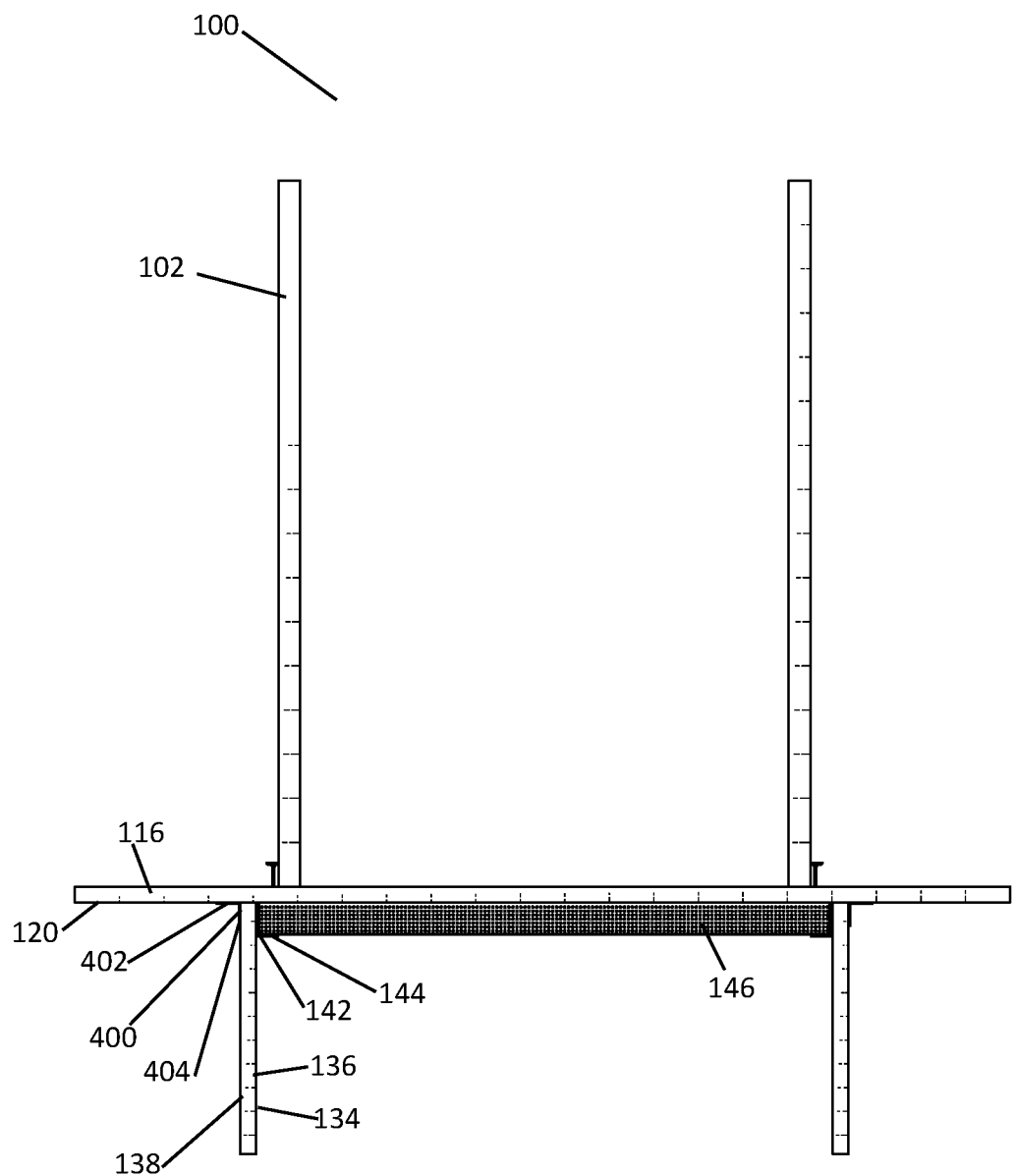
FIG. 5 shows another side plan view of the avian nesting platform connected to at least a portion of a transmission tower, in accordance with an exemplary embodiment of the present invention.
Figure 6:
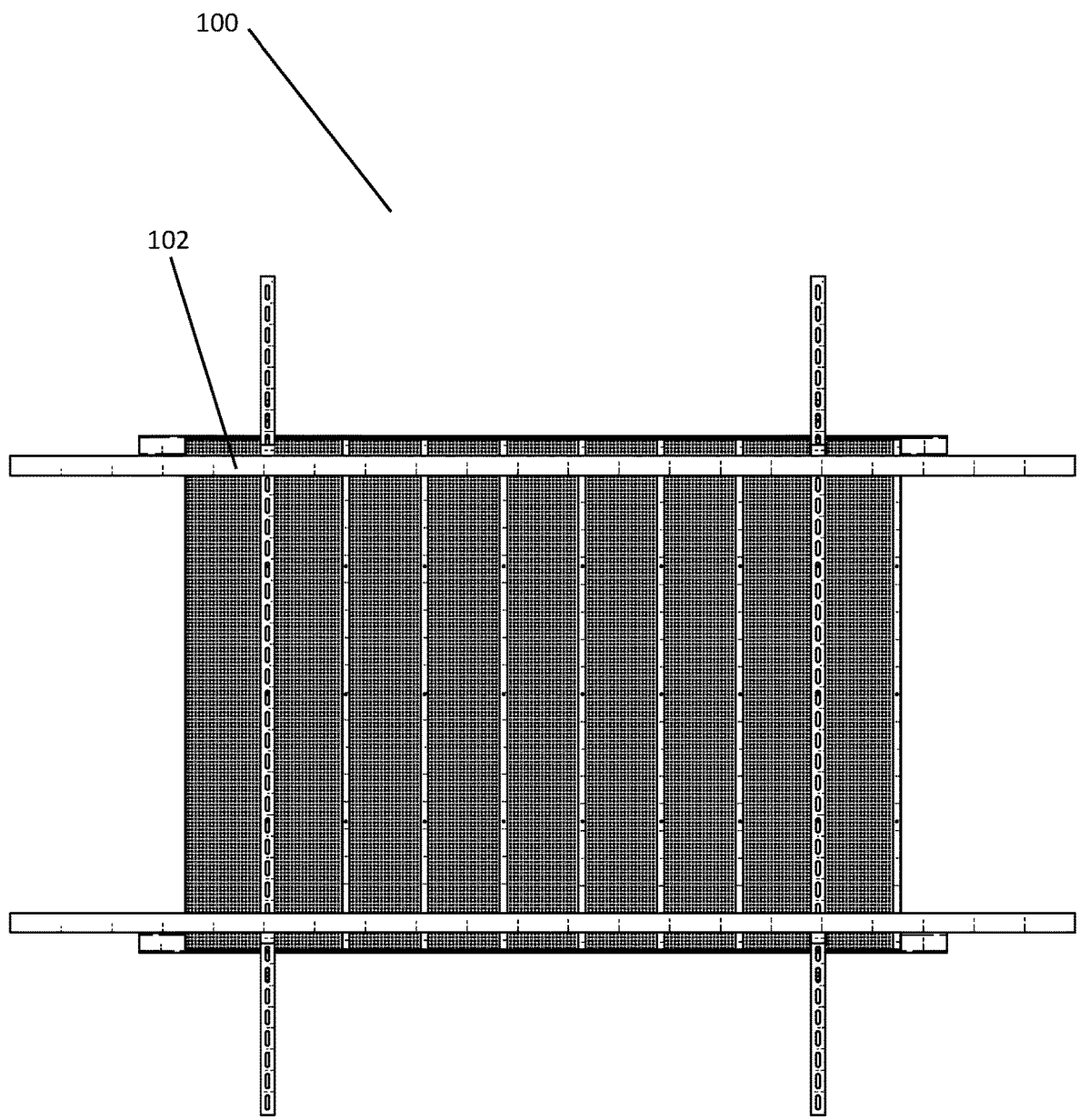
FIG. 6 shows a top plan view of the avian nesting platform connected to at least a portion of a transmission tower, in accordance with an exemplary embodiment of the present invention.
Figure 7:
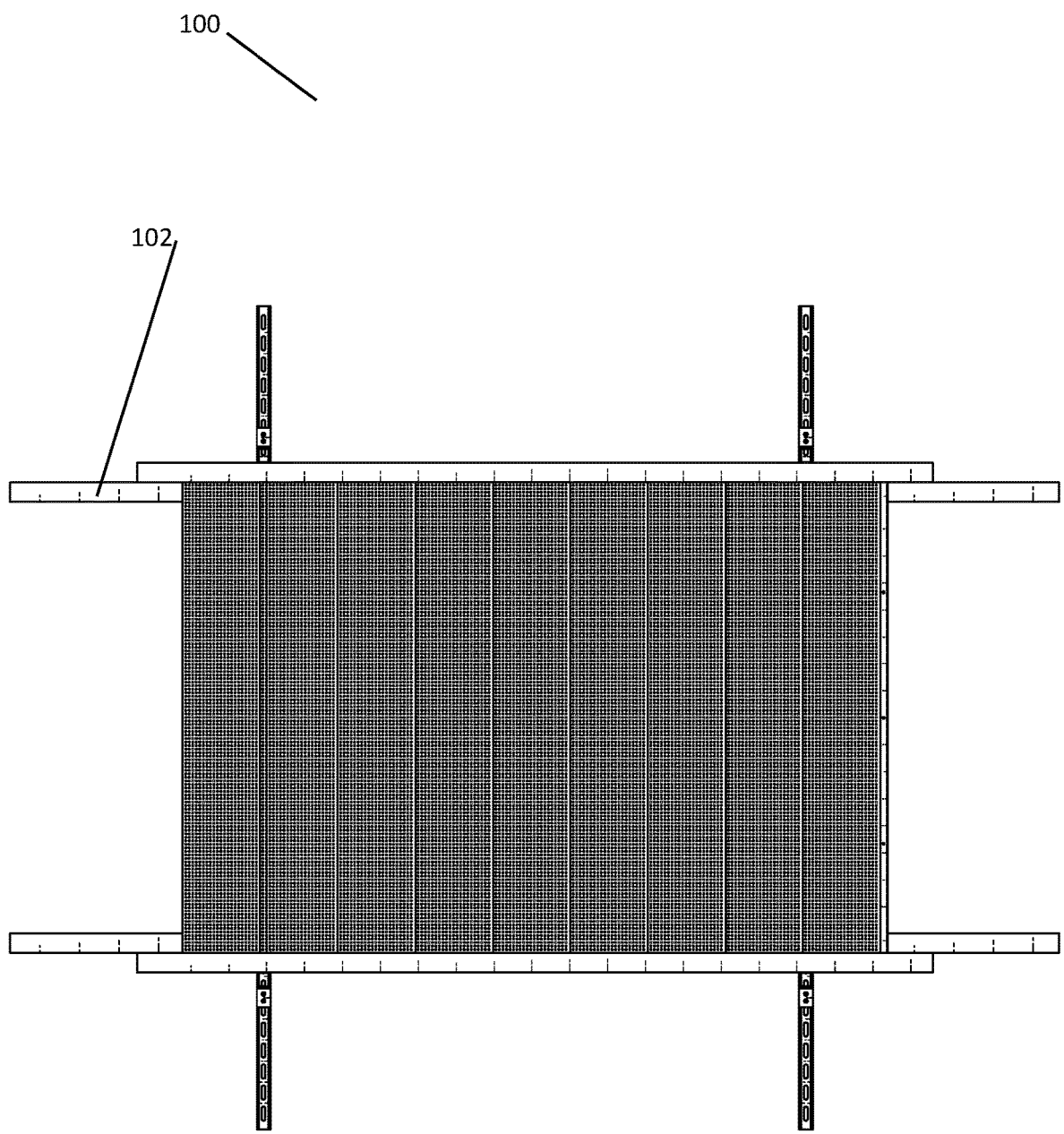
FIG. 7 shows a bottom plan view of the avian nesting platform connected to at least a portion of a transmission tower, in accordance with an exemplary embodiment of the present invention.
Figure 8:
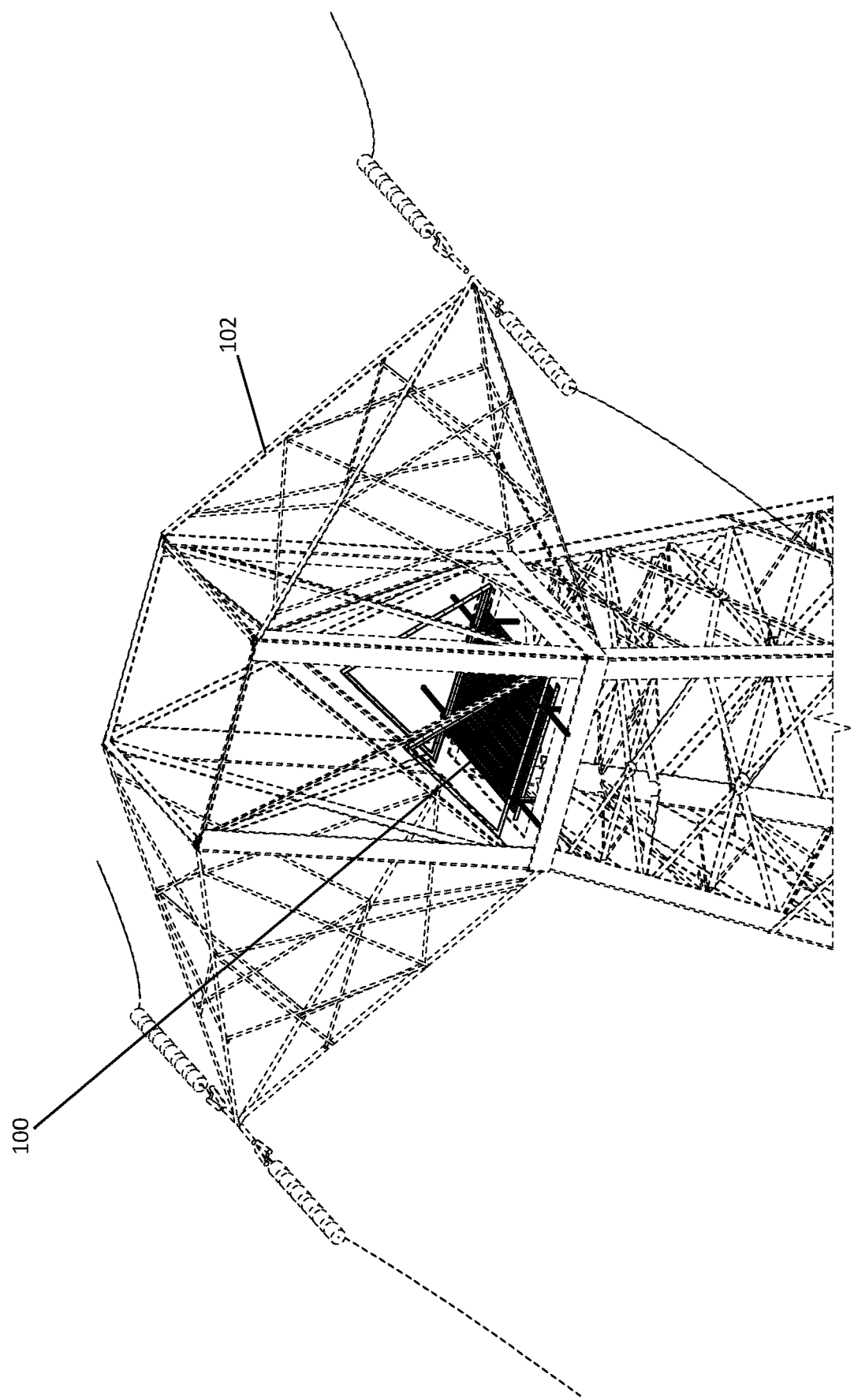
FIG. 8 shows a perspective view of the avian nesting platform connected to at least a portion of a transmission tower, in accordance with an exemplary embodiment of the present invention.

FIGS. 4 and 5 best show one or more angle connectors 400 having first side 402 located perpendicular to second side 404. It is within the scope of this invention for the angle connector to include, but not be limited to an L-bracket, and/or an L-shaped mounting structure. First side 402 of one or more angle connectors 400 is connected to at least a portion of channel side 120 of first strut channel 116. Second side 404 of one or more angle connectors 400 is connected to at least a portion of channel side 138 of second strut channel 136.

FIGS. 1, 4 and 5 show support guide 142 is connected to first side 134 of second strut channel 136. Support guide 142 has protruding structure 144. Protruding structure 144 is connected to at least a portion of the one or more floor panels 104 (FIG. 1). In an embodiment, the support guide may be an L-shaped bracket and/or an L-shaped extrusion. End cap 146 is connected to one or more floor panels 104 (FIG. 1).

FIGS. 10C and 10D show the one or more floor panels 104 having at least one opening 148. Plurality of openings 148 are oriented in a square lattice geometry. One or more floor panels 104 having flange 1000. Flange 1000 of a first floor panel is configured to connect to at least a portion of a second floor panel. The floor panel 104 may have recessed portion 1002 traversing the entire length of substantially planar surface 106. Recessed portion 1002 may traverse the length of first side wall 108 and second side wall 112.

Figure 13:
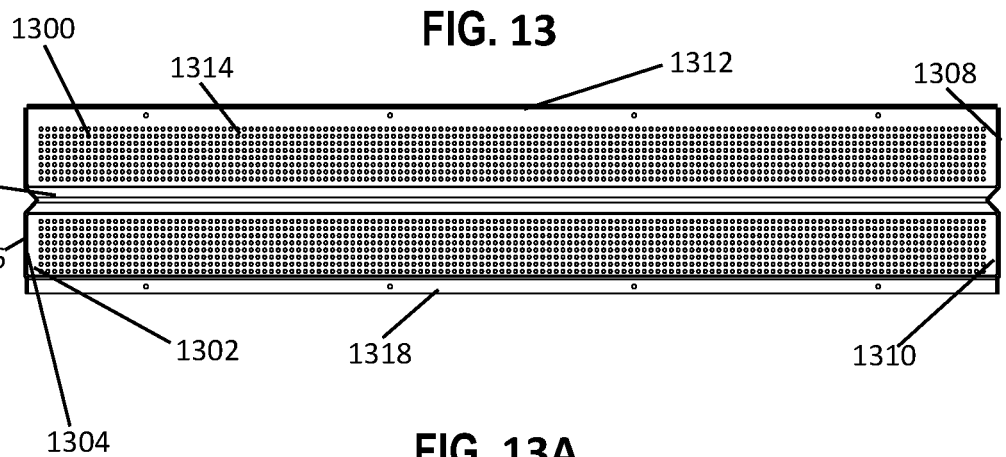
FIG. 13 shows a top plan view of the end cap of the avian nesting platform having a plurality of openings, a recessed portion, and a flange in accordance with an exemplary embodiment of the present invention.
Figure 13A:
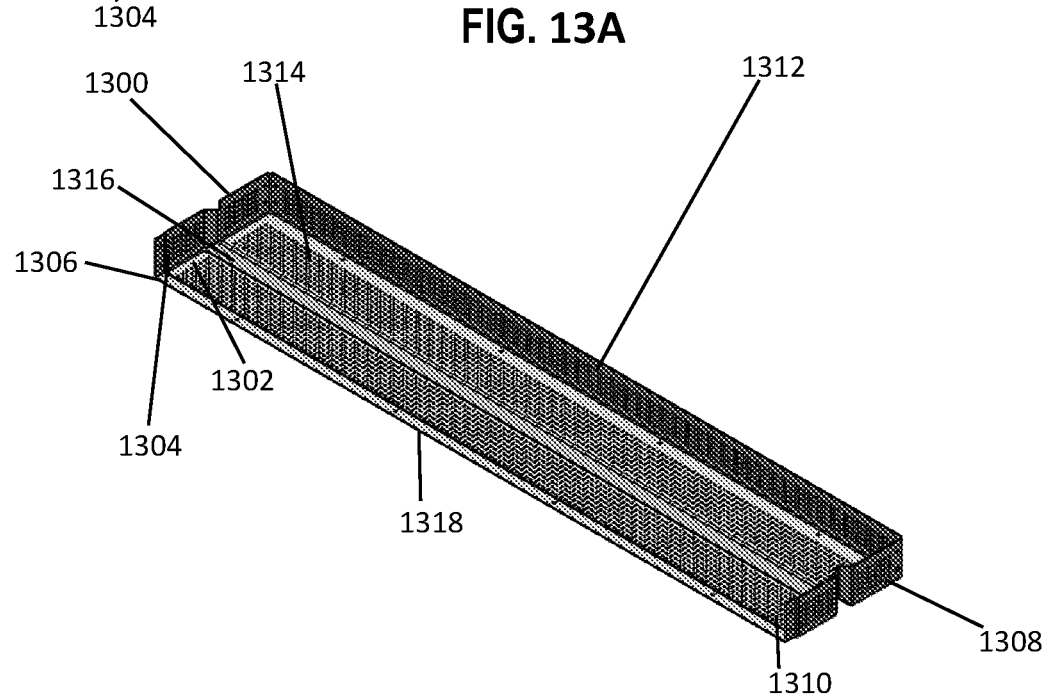
FIG. 13A shows a perspective view of the end cap of the avian nesting platform having a plurality of openings, a recessed portion, and a flange, in accordance with an exemplary embodiment of the present invention.

Referring now to FIGS. 13 and 13A, end cap 1300 has substantially planar surface 1302. First side wall 1304 is connected to first end 1306 of end cap 1300. Second side wall 1308 is connected to second end 1310 of end cap 1300. Third side wall 1312 is located perpendicular to first side wall 1304 and second side wall 1308. Substantially planar surface 1302 of end cap 1300 may have at least one opening 1314. In an embodiment, a plurality of opening may be oriented in a square lattice geometry. In another embodiment, the first side wall, the second side wall, and the third side wall of the end cap have one or more openings. In another embodiment, first side wall 1304 and second side wall 1308 of end cap 1300 have recessed portion 1316 traversing the length thereof. In another embodiment, end cap 1300 may have flange 1318 configured to connect to a floor panel (not shown). Flange 1318 may have one or more openings configured to receive a fastener.

Figure 14:
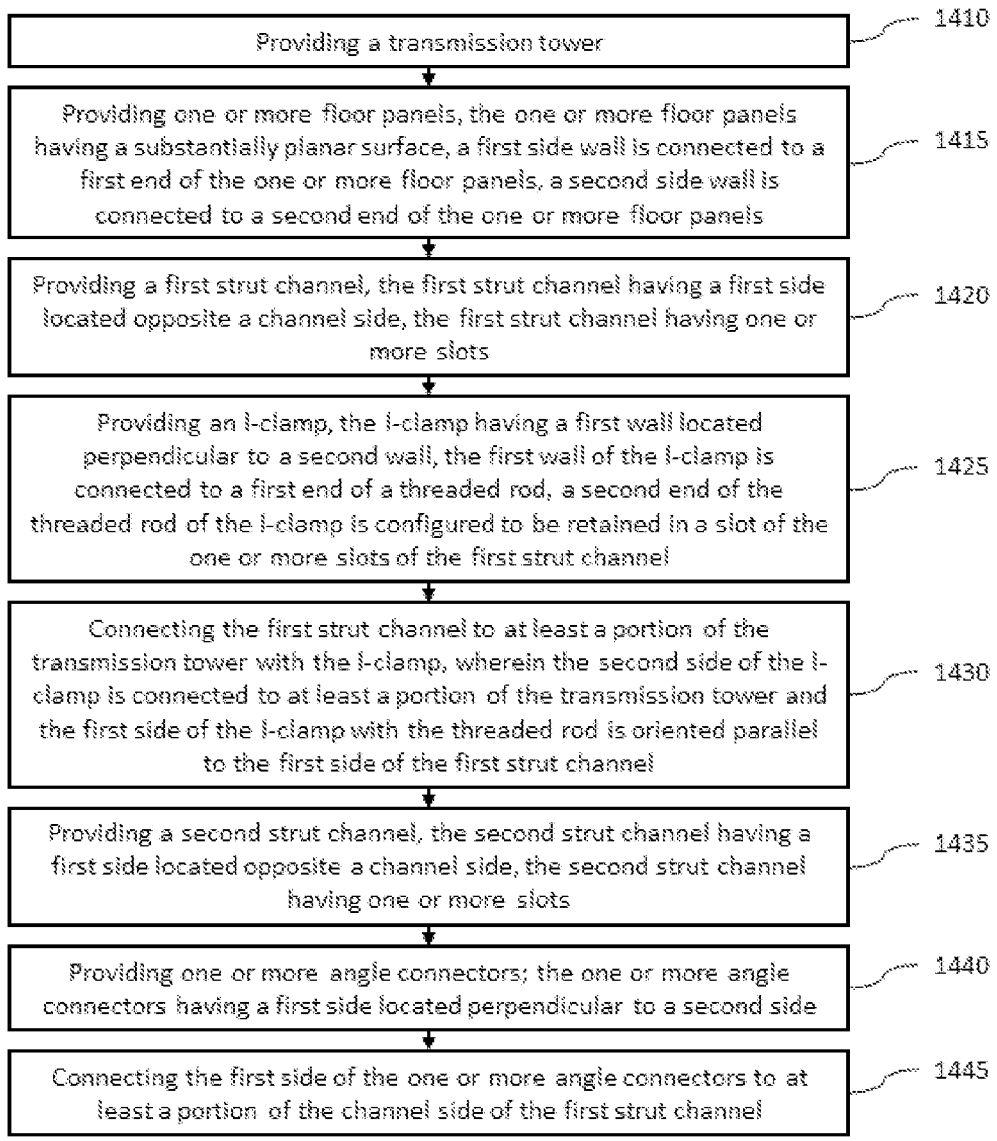
FIGS. 14 and 14A show a flow chart illustrating a method of assembling the avian nesting platform, in accordance with an exemplary embodiment of the present invention.

FIG. 14 is a flowchart of an example method for installing a nesting platform onto a transmission tower, comprising the steps of at step 1410, providing a transmission tower. At step 1415, providing one or more floor panels, the one or more floor panels having a substantially planar surface, a first side wall is connected to a first end of the one or more floor panels, a second side wall is connected to a second end of the one or more floor panels. At step 1420, providing a first strut channel, the first strut channel having a first side located opposite a channel side, the first strut channel having one or more slots. At step 1425, providing an L-clamp, the L-clamp having a first wall located perpendicular to a second wall, the first wall of the L-clamp is connected to a first end of a threaded rod, a second end of the threaded rod of the L-clamp is configured to be retained in a slot of the one or more slots of the first strut channel. At step 1430, connecting the first strut channel to at least a portion of the transmission tower with the L-clamp, wherein the second side of the L-clamp is connected to at least a portion of the transmission tower and the first side of the L-clamp with the threaded rod is oriented parallel to the first side of the first strut channel. At step 1435, providing a second strut channel, the second strut channel having a first side located opposite a channel side, the second strut channel having one or more slots. At step 1440, providing one or more angle connectors; the one or more angle connectors having a first side located perpendicular to a second side. It is within the scope of this invention for a spring nut to be used to fasten the angle connector to the first strut channel. At step 1445, connecting the first side of the one or more angle connectors to at least a portion of the channel side of the first strut channel.

Figure 14A:
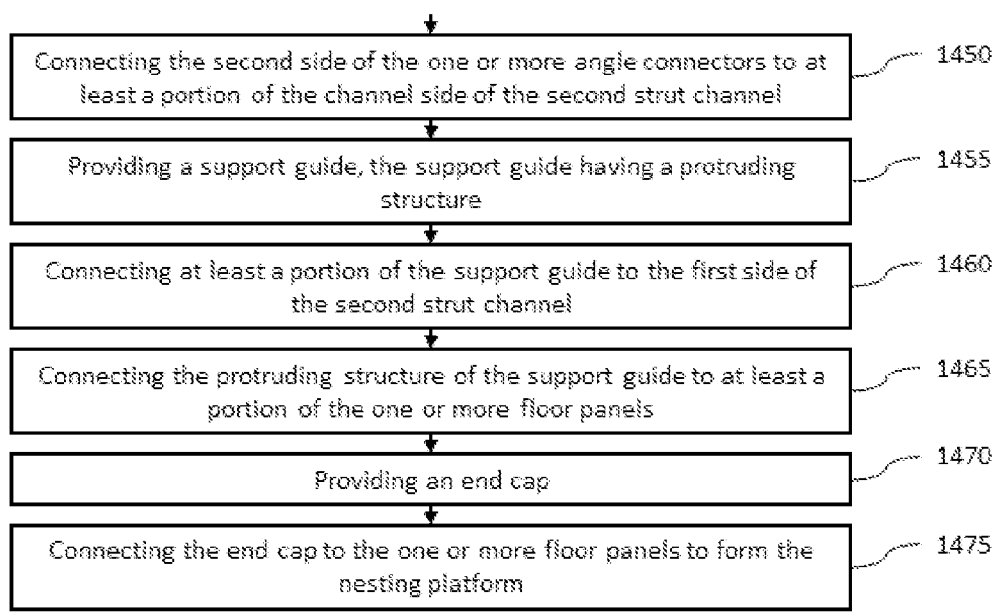

FIG. 14A shows that at step 1450, connecting the second side of the one or more angle connectors to at least a portion of the channel side of the second strut channel with any fastener mechanism such as a spring nut. The strut channels may be cut down to a desired size. At step 1455, providing a support guide, the support guide having a protruding structure. At step 1460, connecting at least a portion of the support guide to the first side of the second strut channel. At step 1465, connecting the protruding structure of the support guide to at least a portion of the one or more floor panels. At step 1470, providing an end cap. At step 1475, connecting the end cap to the one or more floor panels to form the nesting platform.

A. Definitions

It is also to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this invention belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "an opening" can include two or more openings.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated by some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally affixed to the surface" means that it can or cannot be fixed to a surface.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

Disclosed are the components to be used to manufacture the disclosed devices, systems, and articles of the invention as well as the devices themselves to be used within the methods disclosed herein. These and other materials are disclosed herein, and it is understood that when combinations, subsets, interactions, groups, etc. of these materials are disclosed that while specific reference of each various individual and collective combinations and permutation of these materials cannot be explicitly disclosed, each is specifically contemplated and described herein. For example, if a particular material is disclosed and discussed and a number of modifications that can be made to the materials are discussed, specifically contemplated is each and every combination and permutation of the material and the modifications that are possible unless specifically indicated to the contrary. Thus, if a class of materials A, B, and C are disclosed as well as a class of materials D, E, and F and an example of a combination material, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the articles and devices of the invention. Thus, if there are a variety of additional steps that can be performed it is understood that each of these additional steps can be performed with any specific aspect or combination of aspects of the methods of the invention.

It is understood that the devices and systems disclosed herein have certain functions. Disclosed herein are certain structural requirements for performing the disclosed functions, and it is understood that there are a variety of structures that can perform the same function that are related to the disclosed structures, and that these structures will typically achieve the same result.

Additional Description

As described above, the present disclosure relates, in various aspects, to a novel platform for encouraging birds nesting on power towers/poles without damaging power lines/components. In an aspect, a platform for birds nesting is mountable to existing power poles/towers. Many avian nests may rest 4 ft-5 ft above the power lines and above a 120 ft transmission lattice tower. In an example, a standard use for the avian nest guard may be connected to any transmission tower including, but not limited to, a 230 kV transmission power line. In an aspect, the avian nest guard may also be used with H frame (wooden poles) or single monopole (single wood pole or single steel pole). In an aspect, the avian nest guard protects the birds and nest from the high voltage wires and vice versa because it is a physical barrier between the nest and the insulator. In a further aspect, the avian nest guard keeps falling sticks from a bird's nest from causing electrical outages and keeps birds safe from high voltage.

In an embodiment, the avian nest guard is configured to protect the bird, the egg, and the nest from the high voltage wires and vice versa. In an embodiment, the avian nest guard is a physical barrier between a nest and an insulator as it prevents falling sticks from facilitating electrical outages. Thus, birds and their eggs are safe from high voltage output from a transmission tower.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way appreciably intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications can be referenced. The disclosures of these publications in their entirety are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein can be different from the actual publication dates, which can require independent confirmation.

The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

Although very narrow claims are presented herein, it should be recognized the scope of this disclosure is much broader than presented by the claims. It is intended that broader claims will be submitted in an application that claims the benefit of priority from this application.

What is claimed:

1. A nesting platform for a transmission tower, comprising:
    one or more floor panels, the one or more floor panels having a substantially planar surface, a first side wall is connected to a first end of the substantially planar surface of the one or more floor panels, a second side wall is connected to a second end of the substantially planar surface of the one or more floor panels;
    a first strut channel, the first strut channel having a first side located opposite a channel side, the first strut channel having one or more slots;
    an L-clamp, the L-clamp having a first wall located perpendicular to a second wall, the first wall of the L-clamp is connected to a first end of a threaded rod, a second end of the threaded rod of the L-clamp is configured to be retained in a slot of the one or more slots of the first strut channel with a nut;
    a second strut channel, the second strut channel having a first side located opposite a channel side, the second strut channel having one or more slots;
    one or more angle connectors; the one or more angle connectors having a first side located perpendicular to a second side, the first side of the one or more angle connectors connected to at least a portion of the channel side of the first strut channel, the second side of the one or more angle connectors connected to at least a portion of the channel side of the second strut channel;
    a support guide, at least a portion of the support guide connected to the first side of the second strut channel, the support guide having a protruding structure, the protruding structure connected to at least a portion of the one or more floor panels; and,
    an end cap, the end cap connected to the one or more floor panels.

2. The nesting platform of claim 1, wherein the one or more floor panels having at least one opening.

3. The nesting platform of claim 1, wherein the one or more floor panels having a plurality of openings, the plurality of openings oriented in a square lattice geometry.

4. The nesting platform of claim 1, wherein the one or more floor panels having a flange, the flange of a first floor panel is configured to connect to at least a portion of a second floor panel.

5. The nesting platform of claim 1, wherein the end cap has a substantially planar surface, a first side wall is connected to a first end of the end cap, a second side wall is connected to a second end of the end cap, a third side wall is located perpendicular to the first side wall and the second side wall.

6. The nesting platform of claim 5, wherein the substantially planar surface of the end cap has at least one opening.

7. The nesting platform of claim 5, wherein the substantially planar surface of the end cap has a plurality of openings, the plurality of openings oriented in a square lattice geometry.

8. The nesting platform of claim 5, wherein the first side wall, the second side wall, and the third side wall of the end cap have one or more openings.

9. The nesting platform of claim 5, wherein the first side wall and the second side wall of the end cap having a recessed portion.

10. A method of installing a nesting platform onto a transmission tower, comprising the steps of:
    providing a transmission tower;
    providing one or more floor panels, the one or more floor panels having a substantially planar surface, a first side wall is connected to a first end of the one or more floor panels, a second side wall is connected to a second end of the one or more floor panels;
    providing a first strut channel, the first strut channel having a first side located opposite a channel side, the first strut channel having one or more slots;
    providing an L-clamp, the L-clamp having a first wall located perpendicular to a second wall, the first wall of the L-clamp is connected to a first end of a threaded rod, a second end of the threaded rod of the L-clamp is configured to be retained in a slot of the one or more slots of the first strut channel;
    connecting the first strut channel to at least a portion of the transmission tower with the L-clamp, wherein the second side of the L-clamp is connected to at least a portion of the transmission tower and the first side of the L-clamp with the threaded rod is oriented parallel to the first side of the first strut channel;
    providing a second strut channel, the second strut channel having a first side located opposite a channel side, the second strut channel having one or more slots;
    providing one or more angle connectors; the one or more angle connectors having a first side located perpendicular to a second side;
    connecting the first side of the one or more angle connectors to at least a portion of the channel side of the first strut channel;
    connecting the second side of the one or more angle connectors to at least a portion of the channel side of the second strut channel;
    providing a support guide, the support guide having a protruding structure;
    connecting at least a portion of the support guide to the first side of the second strut channel;
    connecting the protruding structure of the support guide to at least a portion of the one or more floor panels;
    providing an end cap; and
    connecting the end cap to the one or more floor panels to form the nesting platform.

11. The method of claim 10, further comprising securing the first strut channel below a nest retained in the transmission tower.

12. The method of claim 10, further comprising inserting the second end of the threaded rod of the L-clamp into the slot of the one or more slots of the first strut channel, connecting a nut to the second end of the threaded rod to secure the first strut channel to the transmission tower.

13. The method of claim 10, wherein the one or more floor panels having at least one opening.

14. The method of claim 10, wherein the one or more floor panels having a plurality of openings, the plurality of openings oriented in a square lattice geometry.

15. The method of claim 10, wherein the one or more floor panels having a flange, connecting the flange of a first floor panel to at least a portion of a second floor panel.

16. The method of claim 10, wherein the end cap having a substantially planar surface, a first side wall is connected to a first end of the end cap, a second side wall is connected to a second end of the end cap, a third side wall is located perpendicular to the first side wall and the second side wall.

17. The method of claim 16, wherein the substantially planar surface of the end cap having at least one opening.

18. The method of claim 16, wherein the substantially planar surface of the end cap having a plurality of openings, the plurality of openings oriented in a square lattice geometry.

19. The method of claim 16, wherein the first side wall, the second side wall, and the third side wall of the end cap have one or more openings.

20. The method of claim 16, wherein the first side wall and the second side wall of the end cap having a recessed portion.

\* \* \* \* \*